United States Patent [19]
Hoffman

[11] 3,768,603
[45] Oct. 30, 1973

[54] TILTING PIN WITH SPRING RETURN
[75] Inventor: Neil R. Hoffman, Saukville, Wis.
[73] Assignee: Kelsey-Hayes Company, Romulus, Mich.
[22] Filed: Dec. 6, 1971
[21] Appl. No.: 205,060

[52] U.S. Cl. .............................................. 188/72.3
[51] Int. Cl. ......................................... F16d 55/224
[58] Field of Search ............................ 188/72.3, 73

[56] References Cited
UNITED STATES PATENTS

| | | | |
|---|---|---|---|
| 3,114,436 | 12/1963 | Larson | 188/72.3 |
| 2,888,109 | 5/1959 | Tankersley | 188/72.3 X |
| 3,018,852 | 1/1962 | Stanton | 188/72.3 |
| 3,150,745 | 9/1964 | Eksergian | 188/72.3 |

Primary Examiner—M. Henson Wood, Jr.
Assistant Examiner—Michael Mar
Attorney—J. King Harness et al.

[57] ABSTRACT

A disk brake assembly embodying a tilting type actuator that is pivoted for actuating the brake pads into engagement with the associated rotor. An improved return spring arrangement is incorporated that permits a compact assembly. The return spring includes a pin that extends through the tilting actuator and which is operatively engaged with one of the brake pads. A spring acts on this pin and biases the brake pad to its retracted position.

5 Claims, 4 Drawing Figures

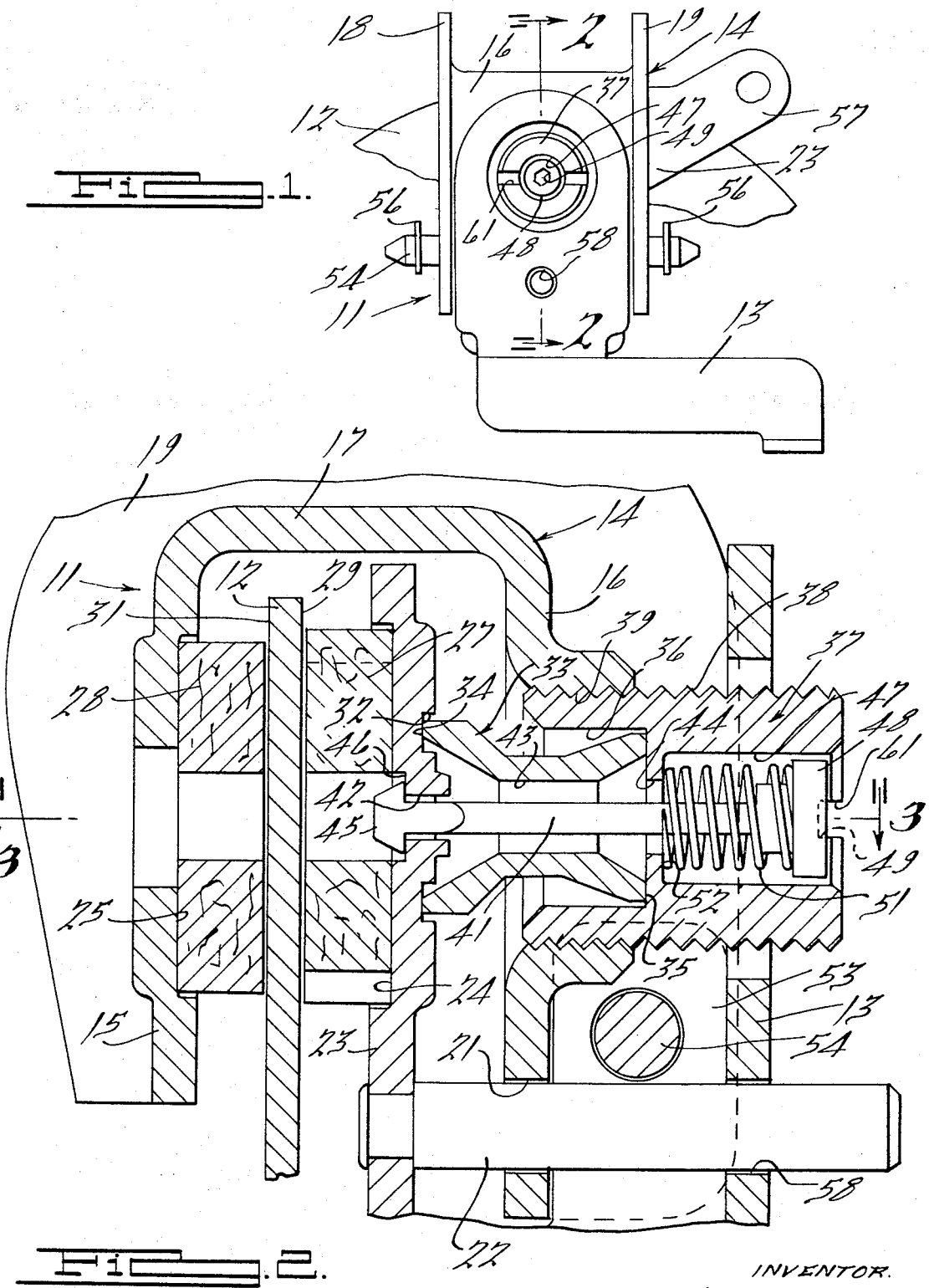

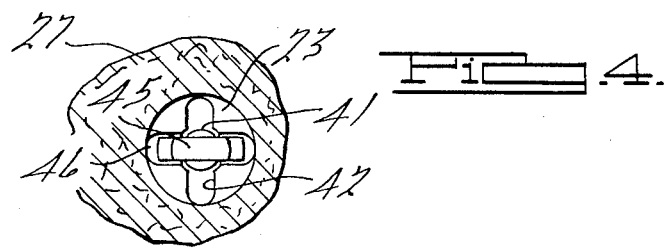
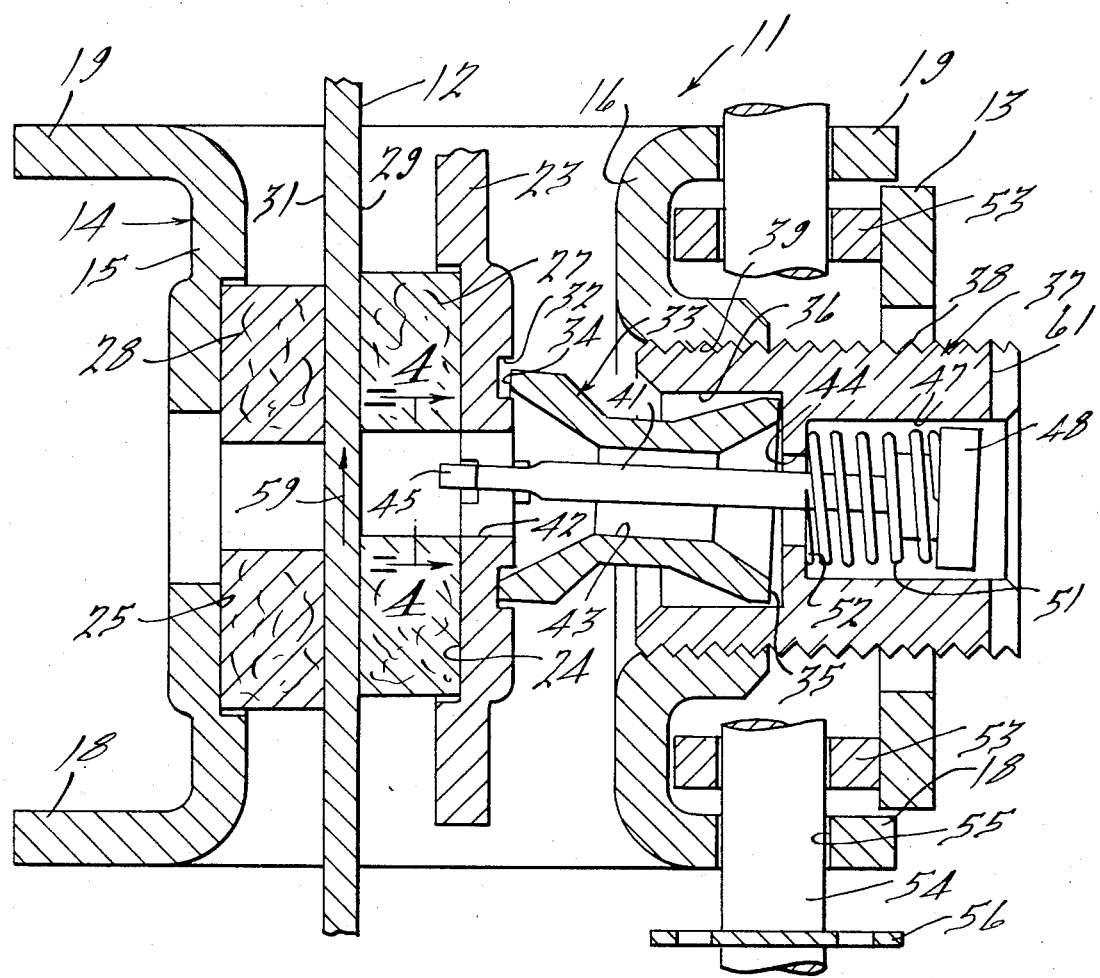

3,768,603

TILTING PIN WITH SPRING RETURN

CROSS REFERENCE TO RELATED APPLICATION

This application is related in subject matter to the copending application of Harold S. Hollnagel, Ser. No. 65,080, filed Aug. 19, 1970, now U.S. Pat. No. 3,708,040 and entitled "Disk Brake With Servo Action."

BACKGROUND OF THE INVENTION

This invention relates to a disk brake assembly and more particularly to an improved return spring arrangement for such a brake.

In certain types of disk brake assemblies, particularly those that are mechanically operated, it is necessary to provide some form of return spring for moving the brake pads to their retracted position after the brake has been actuated. Normally, this is done by using biasing spring force on the actuating lever or in the flexible transmitter assembly that actuates the brake. Such an arrangement leaves the spring in an exposed position and makes for a bulky and difficult to locate assembly. Also, the return spring must, with such arrangements, act through the same actuating linkage and thus overcome the inherent friction in the mechanical system. Since the springs with this type of arrangement do not act directly on the brake pads they must exert the relatively large force and they act in opposite to the mechanical actuator. The return springs themselves may, therefore, result in high actuating loads.

It is, therefore, a principal object of this invention to provide an improved return spring arrangement for a disk brake assembly.

It is another object of this invention to provide a return spring arrangement for a disk brake that acts directly upon a disk brake pad.

One disadvantage of disk brake assemblies is that the conventional brake provides no inherent self-energization. In the aforenoted copending application of Harold S. Hollnagel, there is disclosed a disk brake assembly that provides a self-energizing or servo action. This effect is obtained by using a tilting pin type brake pad actuator. This brake assembly has considerable advantage but has the same disadvantages in connection with its return spring construction as have been noted above.

It is, therefore, a further object of this invention to provide an improved return spring arrangement for a self-energizing disk brake.

SUMMARY OF THE INVENTION

This invention is adapted to be embodied in a disk brake assembly for braking the rotation of an associated rotor. The brake assembly includes a brake pad, a supporting assembly, actuating means for moving the brake pad relative to the supporting assembly and into engagement with the associated rotor. A pin is affixed in at least in part for movement with the brake pad and spring means are interposed between a portion of the supporting assembly and means on the pin for resiliently deflecting the spring means upon actuation of the brake pad and for exerting a restoring force on the brake pad through the pin.

BRIEF DESCRIPTION OF THE DRAWINGS

FIG. 1 is a side elevational view of a disk brake assembly embodying this invention.

FIG. 2 is an enlarged cross sectional view taken along the line 2—2 of FIG. 1.

FIG. 3 is a cross sectional view taken generally along the line 3—3 in FIG. 2 and shows the brake assembly in its actuatd position.

FIG. 4 is a cross sectional view taken along the line 4—4 of FIG. 3.

DETAILED DESCRIPTION OF THE PREFERRED EMBODIMENT

A disk brake assembly embodying this invention is identified generally by the reference numeral 11. The disk brake assembly 11 is adapted to coact with a rotor 12 for braking the rotation of the rotor 12 in a manner which will become more apparent as this description proceeds. The rotor 12 is affixed for rotation in any known manner with a wheel or driving component and is rotatable relative to a fixed support member 13.

The brake assembly 11 includes a former caliper, indicated generally by the reference numeral 14 which caliper is formed from sheet metal or the like. The caliper 14 defines a throat or central opening through which the periphery of the rotor 12 extends. Leg portions 15 and 16 of the caliper are disposed on diametrically opposite sides of the rotor 12. A web portion 17 interconnects the leg portions 15 and 16. Each of the caliper portions 15, 16 and 17 is reinforced by a pair of peripheral reinforcing ribs 18 and 19.

The caliper leg 16 is formed with a bore 21 that pivotally supports a pin 22. The pin 22 is affixed to a combined backing plate and actuating lever 23. The backing plate 23 and caliper leg 15 are formed with respective recesses 24 and 25 in which frictional lining materials 27 and 28 are disposed and affixed, as by bonding or the like. The frictional linings 27 and 28 are juxtaposed to respective annular brake surfaces 29 and 31 of the rotor 12.

On the side opposite its recess 24, the backing plate 23 is formed with an annular recess 32. A generally hour glass shaped tilting actuator, indicated generally by the reference numeral 33, has a first annular end portion 34 that is received in the recess 32. A second, smaller diameter end portion 35 is received within a counterbore 36 of an adjusting member, indicated generally by the reference numeral 37. The adjusting member 37 has external threads 38 that are turned into internal threads 39 formed in the caliper leg 16.

A pin, indicated generally by the reference numeral 41 extends through an oval shaped opening 42 in the backing plate 23, a central opening 43 in which tilting actuator 33 and a bore 44 formed at the base of the adjusting member counterbore 36. The pin 41 is flattened at its outer end, as at 45. The flattened portion 45 is passed through the oval shaped recess 42 and turned through 90° so as to register in a complementary recess 46 formed in the backing plate 23. This engagement holds the portions in their assembled relationship.

From the bore 44, the pin extends into a larger diameter counterbore 47 formed in the adjusting member 37 and extending through its outer extremity. The pin 41 has a large diamter head 48 that is positioned within the counterbore 47 which head is formed with a socket opening 49, to facilitate assembly and disassembly. A coil compression spring 51 is received within the counterbore 47 and encircles the pin 41. The spring 51 bears against the head 48 and a shoulder 52 formed at the base of the counterbore 47 for a purpose which will become apparent as this description proceeds.

The fixed support member 13 has a pair of inwardly extending flanges 53 that are bored so as to pass a support pin 54. The support pin 54 also extends through bores 55 formed in the caliper ribs 18 and 19 so as to pivotally support the caliper 14 relaive to the supporting member 13. The pin 54 is held axially in position by means of snap rings or the like 56.

OPERATION

The combined backing plate and actuating lever 23 has an outstanding actuating arm 57 that is adapted to be connected in any known manner to a brake actuating member (not shown). Normally, the spring 51 will act on the brake assembly and will hold the frictional linings 27 and 28 in a retracted or light rubbing contact condition with the rotor surfaces 29 and 31.

When it is desired to actuate the brake, a force is exerted on the actuating lever arm 57 to pivot the combined actuating lever and backing plate 23 about the pivot pin 22 and its journal in the caliper bore 21. If desired, the pin 22 may be extended so as to pass through a bore 58 in the supporting member 13 to provide further support. When the backing plate and lever 23 is pivoted a force will be exerted on the tilting actuator 33 as shown in FIG. 3. This tilting of the actuator 33 generates an axial force on the backing plate 23 and its associated frictional lining 27 so as to urge it into engagement with the rotor braking surface 29. At the same time, a reactive force will be exerted on the caliper 14 that causes it to pivot and slide relative to the supporting member 13 and to bring the lining 28 into engagement with the rotor braking surface 31. The bores 55 and 58 have sufficient diameter so as to permit this movement while holding the caliper assembly 14 against rotation.

The normal direction of rotation of the rotor 12 is indicated by the arrow 59 in FIG. 3. It will be noted that this in effect creates a self-energizing action due to the angled relation of the actuator 33. Hence, some servo action is effected.

When the brake is actuated the backing plate 23 and caliper 14 move axially relative to each other. Since the pin 41 is restrained to move axially with the backing plate 23, the coil spring 51 will be compressed. Due to this compression, the spring 51 will exert a restoring force on the brake assembly when the actuating force is relieved.

The adjusting member 37 is slotted at its outer end, so at 61 so as to permit adjustment of the brake to compensate for wear of the linings 27 and 28. The brake assembly may also be conveniently disassembled by applying an axial force on the pin 41 through its socket head 48 and rotating it. The flattened head 45 of the pin 41 may then be withdrawn through the complementary shaped aperture 42 and the remaining components disassembled in what is believed to be an obvious manner.

It is to be understood that the foregoing description is that of a preferred embodiment of the invention. Various changes and modifications may be made without departing from the spirit and scope of the invention as defined by the appended claims.

I claim:

1. A disk brake assembly for braking the rotation of an associated rotor comprising a brake pad, a supporting assembly, a pin affixed at least in part for movement with said brake pad, an annular actuating element surrounding said pin, actuating means for tilting said annular actuating element for bringing said brake pad into engagement with the associated rotor, and spring means interposed between a portion of said supporting assembly and means on said pin for resilient deflection of said spring means upon actuation of said brake pad and for exerting a restoring force on said brake pad through said pin.

2. A disk brake assembly as set forth in claim 1 further including means for adjusting the position of the brake pad relative to the supporting member to compensate for frictional lining of the brake pad.

3. A disk brake assembly as set forth in claim 1 wherein the supporting assembly is comprised of a caliper and further including a second brake pad fixed relative to the caliper and juxtaposed to the other side of the rotor, and the actuating means including mans for moving said caliper relative to the rotor upon actuation of the first mentioned brake pad for bringing said second brake pad into engagement with the associated rotor surface.

4. A disk brake assembly as set forth in claim 3 wherein the first brake pad is supported for pivotal movement relative to the caliper and the means for tilting the annular member includes means for pivoting the first brake pad.

5. A disk brake assembly for braking the rotation of an associated rotor comprising a brake pad, a supporting assembly, actuating means for moving said brake pad relative to said supporting assembly into engagement with the associated rotor, said brake pad including a backing plate having a slotted opening therein, a pin having a portion complementary to said opening and detachably connected to said backing plate, said pin having an enlarged headed portion spaced from the first mentioned portion, and spring means interposed between said supporting assembly and said pin head portion for resilient deflection of said spring means upon actuating said brake pad and for exerting a restoring force on said brake pad through said pin.

* * * * *